(12) United States Patent
Wickett

(10) Patent No.: US 9,735,651 B2
(45) Date of Patent: Aug. 15, 2017

(54) ENERGY PRODUCTION DEVICE AND SYSTEM

(71) Applicant: Martin John Wickett, Bude (GB)

(72) Inventor: Martin John Wickett, Bude (GB)

(*) Notice: Subject to any disclaimer, the term of this patent is extended or adjusted under 35 U.S.C. 154(b) by 17 days.

(21) Appl. No.: 15/023,932

(22) PCT Filed: Sep. 25, 2014

(86) PCT No.: PCT/EP2014/070547
§ 371 (c)(1),
(2) Date: Mar. 22, 2016

(87) PCT Pub. No.: WO2015/044296
PCT Pub. Date: Apr. 2, 2015

(65) Prior Publication Data
US 2016/0218594 A1 Jul. 28, 2016

(30) Foreign Application Priority Data

Sep. 26, 2013 (GB) .................................. 1317082.4
May 14, 2014 (GB) .................................. 1408581.5

(51) Int. Cl.
*H02K 7/18* (2006.01)
*F03G 7/08* (2006.01)

(52) U.S. Cl.
CPC ............. *H02K 7/1853* (2013.01); *F03G 7/08* (2013.01)

(58) Field of Classification Search
CPC .................................. H02K 7/1853; F03G 7/08
(Continued)

(56) References Cited

U.S. PATENT DOCUMENTS 4,438,343 A * 3/1984 Marken .................. F03B 13/20
290/53
4,966,254 A 10/1990 Nakano
(Continued)

FOREIGN PATENT DOCUMENTS

FR 2 991 397 12/2013
GB 2 444 656 A 6/2008
(Continued)

OTHER PUBLICATIONS

British Search Report dated Dec. 15, 2014 for Application No. GB1408581.5.
(Continued)

*Primary Examiner* — Viet Nguyen
(74) *Attorney, Agent, or Firm* — Fay Sharpe LLP

(57) ABSTRACT

An energy production device including a frame, a body, first and second aligned input shafts projecting from two opposite faces of the body, and a third input shaft aligned with an output shaft. The direction of the first and second input shafts is perpendicular to the direction of the third input shaft and of the output shaft. A mechanical connection is provided at the proximal part of each of the shafts which is within the body. The mechanical connection operates with a transmission system within the body so that any rotation movement on any of the input shafts is converted into a unidirectional rotation movement on the output shaft. A distal end of the third input shaft is fixed to the frame. A bearing is fixed on the frame, into which the distal end of the output shaft is freewheeling. A first pendulum is mounted on a bearing at the distal end of the first input shaft to pivot around the first input shaft and a second pendulum mounted on a bearing at the distal end of the second input shaft to pivot around the second input shaft.

12 Claims, 12 Drawing Sheets

(58) Field of Classification Search
USPC .................................... 290/1 C, 1 R, 42, 53
See application file for complete search history.

(56) References Cited

U.S. PATENT DOCUMENTS

| | | | |
|---|---|---|---|
| 6,247,308 B1 | 6/2001 | Solell | |
| 8,816,516 B2* | 8/2014 | Vuong | F03G 7/10 |
| | | | 290/1 C |
| 2007/0138793 A1* | 6/2007 | Zimmerman | F03B 13/20 |
| | | | 290/1 R |
| 2010/0283249 A1* | 11/2010 | Harden | F03B 13/141 |
| | | | 290/53 |
| 2010/0319340 A1* | 12/2010 | Wickett | F03B 13/182 |
| | | | 60/505 |
| 2013/0023365 A1* | 1/2013 | Idoni-Matthews | A63B 43/00 |
| | | | 473/570 |
| 2013/0207403 A1* | 8/2013 | Eichhorn | F03G 3/06 |
| | | | 290/1 R |

FOREIGN PATENT DOCUMENTS

| | | |
|---|---|---|
| JP | S55 57674 A | 4/1980 |
| JP | 64 55469 | 3/1989 |
| WO | WO 2005/071258 A1 | 8/2005 |

OTHER PUBLICATIONS

British Search Report dated Mar. 14, 2014 for Application No. GB1317082.4.
International Search Report mailed Apr. 29, 2015 for International application No. PCT/EP2014/070547.
Written Opinion mailed Apr. 29, 2015 for International application No. PCT/EP2014/070547.

* cited by examiner

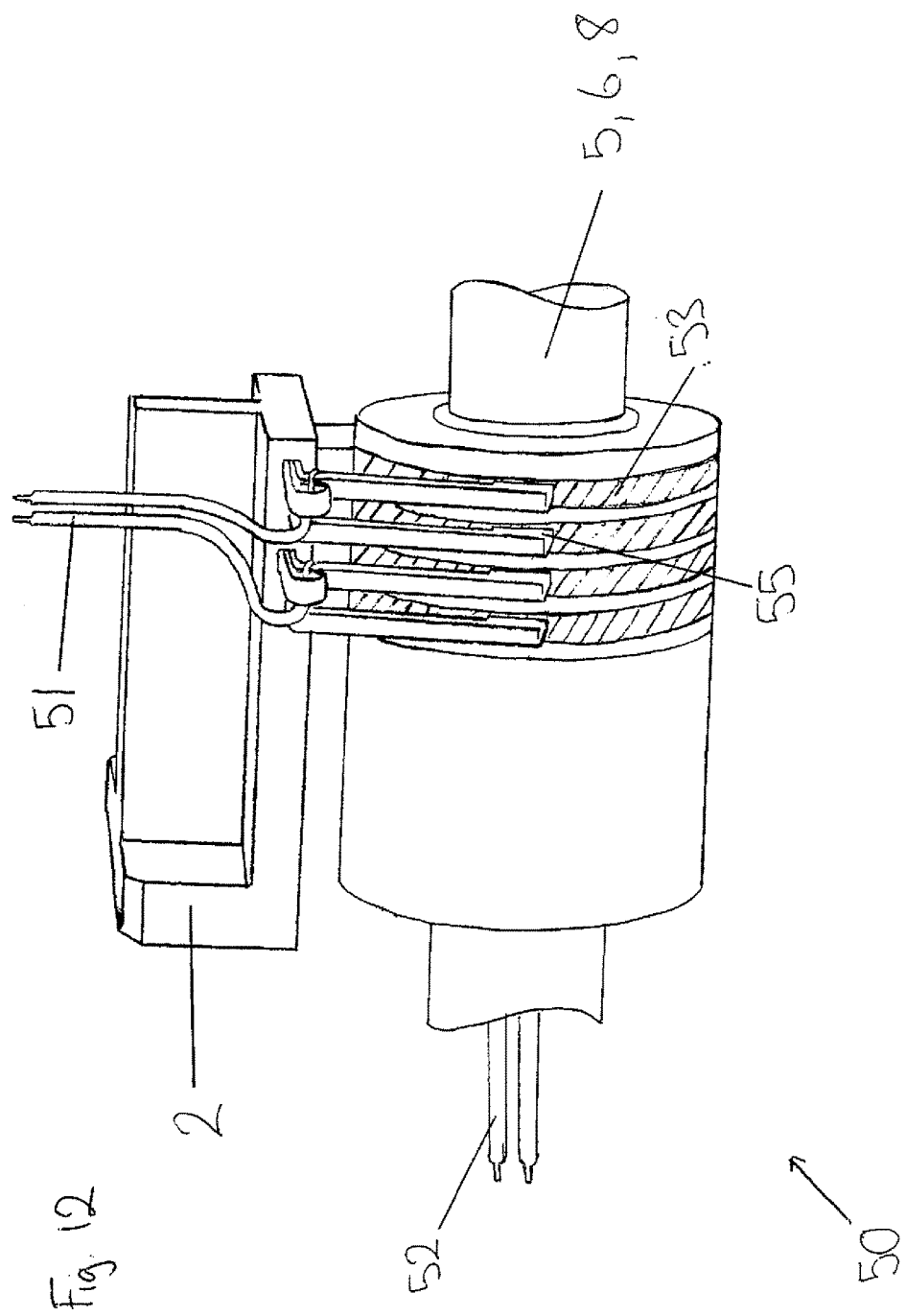

ENERGY PRODUCTION DEVICE AND SYSTEM

The invention relates to the domain of energy production, and in particular relates to an energy production device and system.

Energy needs are constantly increasing due to the development of technology and to the increasing share of people gaining easier access to it.

Fossil energies, such as coal or oil, used to be rather cheap energies. Due to an important exploitation of these fossil energies, the resources in fossil energies are decreasing and it now becomes more and more expensive to use these energies. Moreover, when used, fossil energies are polluting the environment, in that they consume energy to be extracted, generate gases and particles when used, and contribute to the reduction in global resources of energy.

To meet the growing demand in energy while trying to reduce the consumption of fossil energy resources, other energy resources were exploited, such as solar energy, wind energy or tidal energy.

Solar energy currently requires semiconductor devices, which are complex to design and which have a short lifetime. Solar energy is indeed mainly in the form of photovoltaic panels currently requiring semiconductor devices, which require a lot of energy to manufacture. Furthermore solar electricity generation is limited to periods of available sunshine, is not available at all during the night and is significantly reduced during cloudy weather.

Wind energy requires large mechanical systems to provide sufficient energy, which systems are expensive to design and install, and generate a rotary noise when used (wind turbines generate a noise pollution).

Tidal energy can generate large amounts of energy with large mechanical systems, whether onshore or offshore. The disadvantage of these systems is that they have to be in contact with water in movement, which implies frequent maintenance and generates fatigue and corrosion in said mechanical systems. As a consequence, these systems also have a limited lifetime.

Other devices have been developed which harvest energy from the ambient environment either thermally such as heat pumps, or kinetically from mechanical devices harvesting energy from the incidental movement of other systems, such a dynamo on a bicycle for example, or more recently from walkers' jogging motion or footsteps. These devices have so far been either of very low efficiencies or too unreliable to be economically viable.

The inventor of the present invention tried to solve the above-mentioned problems of the prior art and designed a device which is autonomous and generates energy by its own movement in an unstable environment where there is movement, such as in a turbulent fluid for example, or attached to a jogger or walker or cyclist, which comprises a robust mechanism, and which is isolated from the outer environment to provide a longer lifetime and lower maintenance costs.

The inventor of the present invention tried to solve the above-mentioned problems of the prior art and designed a device which is autonomous and generates energy by its own movement in an unstable environment where there is movement, such as in a fluid flow for example, which requires simple mechanics, and which is isolated from the outer environment to provide a longer lifetime and less maintenance costs.

An object of the invention is an energy production device, characterized in that it comprises:
  a frame;
  a body;
  at least one first input shaft;
  a further input shaft aligned with an output shaft;
  mechanical connection means at the proximal end of each of the shafts which is within the body, said mechanical connection means operating with a transmission system within the body so that any rotation movement of any of the input shafts is converted into a unidirectional rotation movement of the output shaft;
  the further input shaft being fixed to the frame;
  a bearing fixed on said frame, into which the distal end of the output shaft is mounted and freewheeling;
  at least a first pendulum mounted on the first input shafts to pivot with the first input shaft;
  an alternator, preferably but not exclusively within the frame, connected to the output shaft to convert the unidirectional movement of the output shaft into electricity, and
  external electrical connection means on the outside surface of the frame electrically connected to the generator to permit electricity generated by the energy production device to be used.

Preferably the energy production device comprised a battery for storing electrical charge. Power conversion means are preferably included for converting the generated AC power into DC which can be stored in the battery. The external electrical connection means may be DC.

The battery may be located in the pendulum and dynamic power transfer means are provided between the alternator and the pendulum in order to transfer the power between the relatively rotating structures of the frame and the pendulum respectively to store generated power in the battery and to draw stored charge from the battery.

An object of the invention is an energy production device, characterized in that it comprises:
  a frame;
  a body;
  first and second aligned input shafts projecting from two opposite faces of the body;
  a third input shaft aligned with an output shaft, the direction of the third input shaft and of the output shaft being perpendicular to the direction of the first and second input shafts;
  mechanical connection means at the proximal end of each of the shafts which is within the body, said mechanical connection means operating with a transmission system within the body so that any rotation movement on any of the input shafts is converted into a unidirectional rotation movement on the output shaft;
  a distal end of the third input shaft being fixed to the frame;
  a bearing fixed on said frame, into which the distal end of the output shaft is freewheeling;
  a first pendulum mounted on a bearing at the distal end of the first input shaft to pivot around the first input shaft; and
  a second pendulum mounted on a bearing at the distal end of the second input shaft to pivot around the second input shaft.

In the present application, the terms "distal" and "proximal" for a shaft are defined with respect to the body, the distal end of a shaft being the end of the shaft which is farther from the body, the proximal end of a shaft being the end of the shaft which is closer to the body.

The third input shaft and the output shaft are preferably coaxially mounted.

The device according to the invention is therefore arranged so that its body moves about its input shaft fixed to the frame, and has two pendulums on two opposites shafts, which pendulums move about the body of the device through their respective input shafts.

A device converting any rotation movement on any of three input shafts to a unidirectional rotation movement on a single output shaft is described in the UK patent application GB2444656 by the same inventor.

An advantage of the device of the invention is that, when it is fixed to a frame in a moving environment, the body is moving with respect to the frame, and the pendulums move with respect to the body, which generates movement converted into energy on the output shaft. This means that the device of the invention can generate energy from its own, when its frame is left in an unstable environment, such as a fluid flow (tide for example).

According to an embodiment, the energy production device further comprises an alternator, preferably but not exclusively within the frame, connected to the output shaft to convert the unidirectional movement of the output shaft into electricity.

The alternator can be connected to a battery, also preferably but not exclusively within the frame, or connected to a utility grid to output energy.

According to another embodiment, the energy production device further comprises a battery connected to the alternator to store electrical energy produced by the alternator.

According to another embodiment, the body is spherically-shaped, the first and second input shafts being substantially on one of the diameters of the sphere, the end of the weight of each of the pendulums facing the body being curved complimentary to the shape of the body to be able to pivot around the body. The pendulums can rotate around the body at 360°.

The body can have any shape, as long as the pendulums can pivot around the body, and the invention is not limited to a spherical shape of the body. The pendulums are designed so that, whatever the position of the pendulum with respect to the body, the weight of the pendulum does not enter into contact with any of the shafts, to allow a maximum pivoting movement of the pendulums around the body, and hence a maximum production of energy. The shape of the pendulums is designed so that they do not interfere with the shape of the body when rotating around their respective shafts, so that they can rotate, to the extent of 360°, around their respective shafts.

According to another embodiment, each pendulum further comprises a counterbalance weight, on the end of the arm of the pendulum opposite to the end supporting the main weight of the pendulum.

The effect of the counterbalance weight is to slow the frequency of the movement of the pendulum with respect to a pendulum with the same weight and no counterbalance weight.

The counterbalance weight can also be curved shaped.

According to another embodiment, the pendulums pivot independently from each other.

According to another embodiment, the weights of the pendulums are rigidly linked so as to be able to pivot synchronously around each of their respective shafts.

According to another embodiment, the mechanical connection means of the shafts to the transmission system are any of toothed gears, chains and cogs, belts and pulley wheels and any combination thereof.

According to another embodiment, the transmission system between the mechanical connection means of the input shafts and the mechanical connection means of the output shaft comprises any of toothed gears, chains and cogs, belts and pulley wheels and any combination thereof.

Another object of the invention is an energy production system, characterized in that it comprises an enclosure into which is fixed the frame or which constitutes the frame of the energy production device as defined above, and an electrical energy storage device electrically connected to the alternator of the energy production device.

Aspects, features and advantages of embodiments of the present invention will become apparent from the following description of the invention when taken in reference to the appended drawings, in which like numerals denote like elements, and in which:

FIG. 12 is an enlarged perspective view of the dynamic electric power transfer means used in the input and output shafts.

Referring now to FIGS. 1-6, an embodiment of an energy production device 1 according to the invention is shown.

Figure 1:
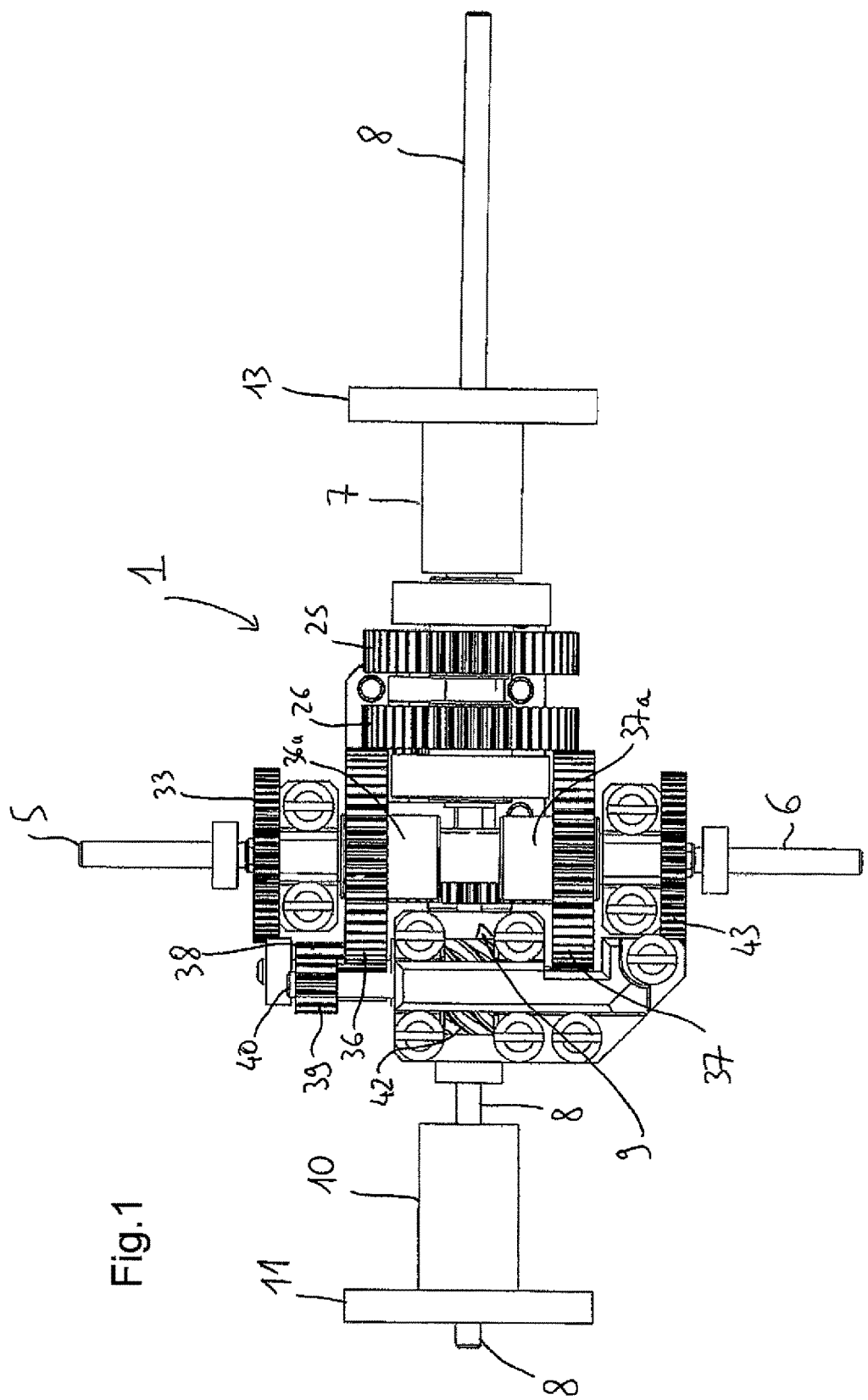
FIG. 1 is a partial cut-away top view of a body of an energy production device according to a first embodiment of the invention.
Figure 2:
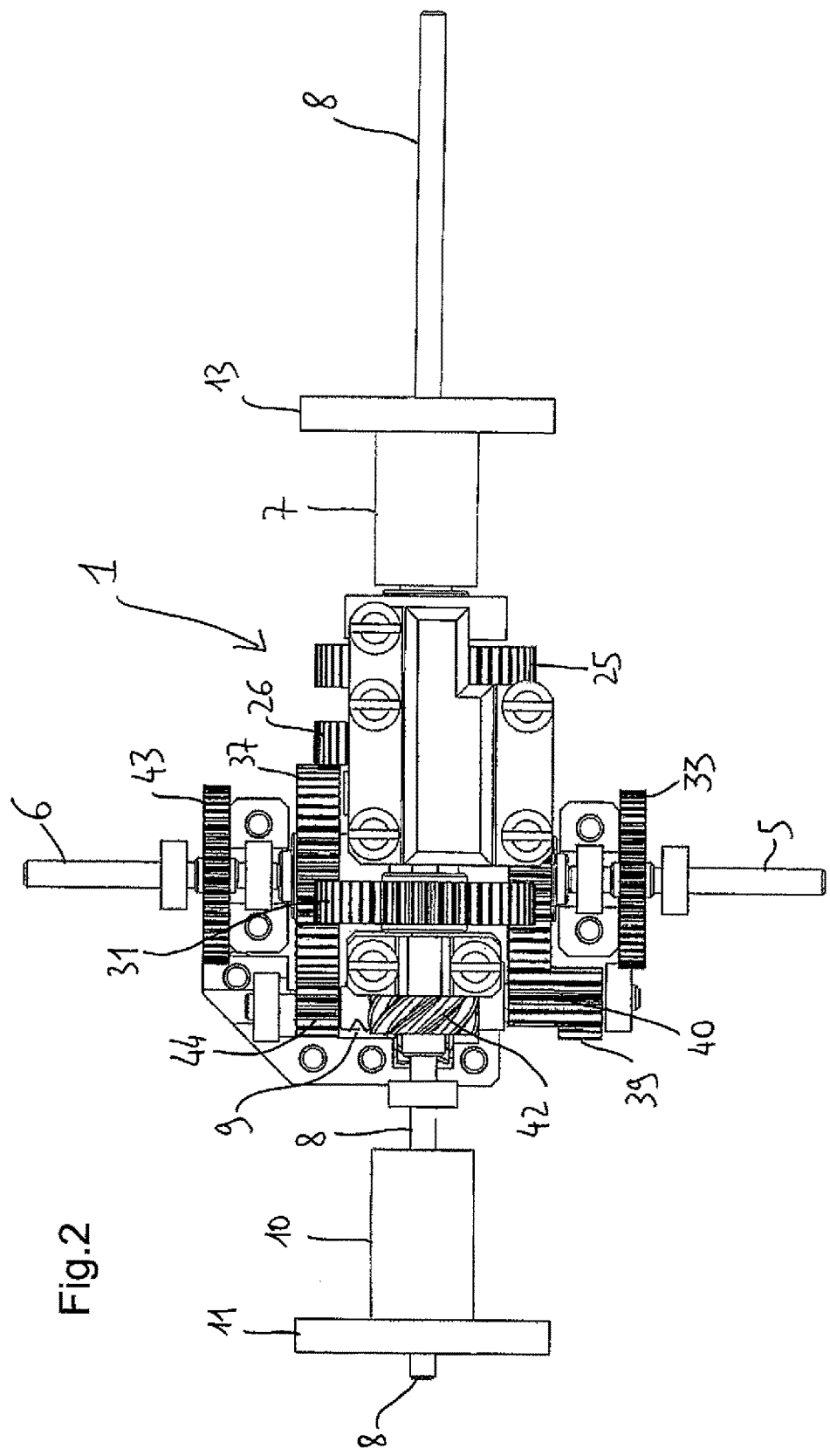
FIG. 2 is a bottom view of the body of FIG. 1.
Figure 3:
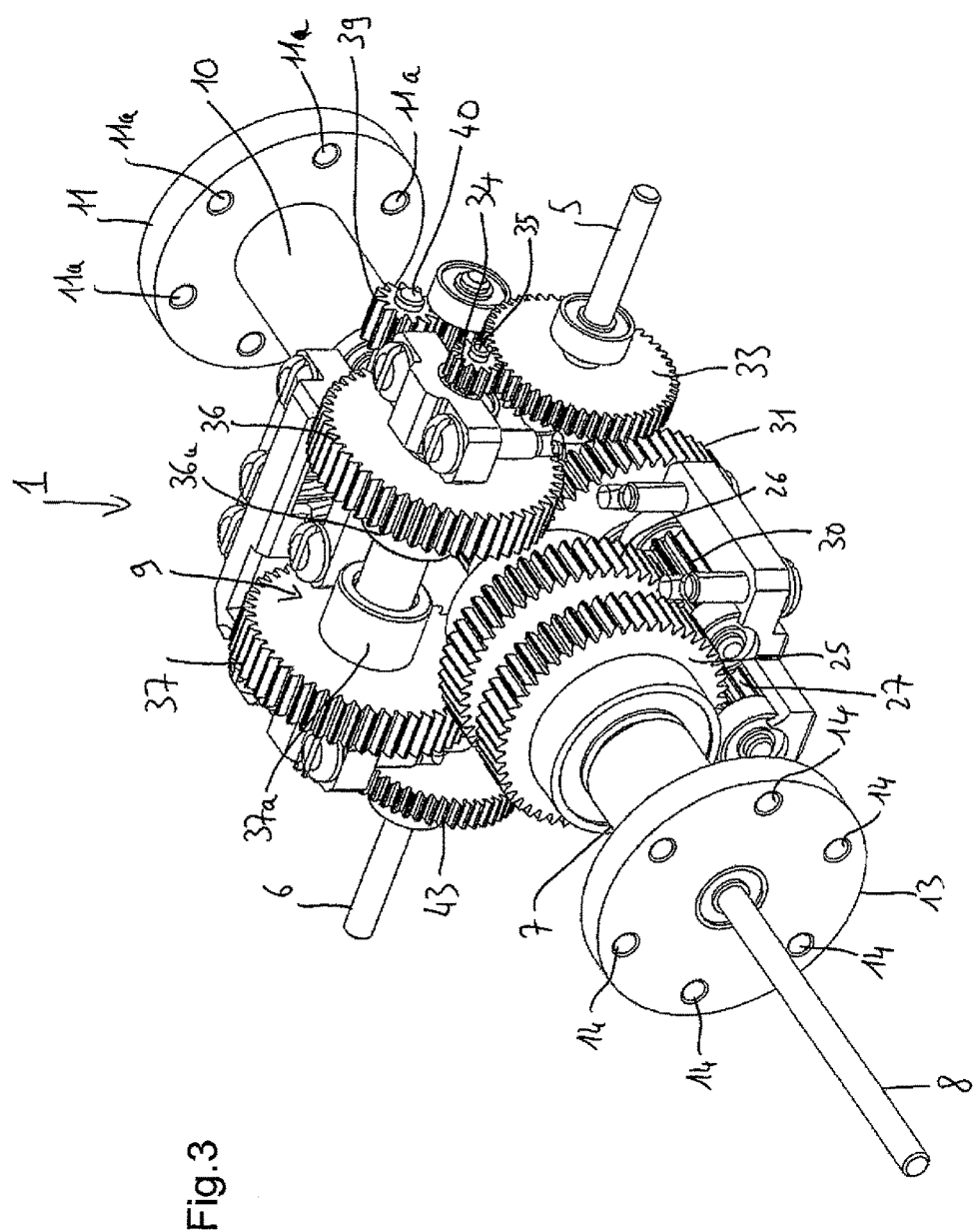
FIG. 3 is a perspective view of the body of FIG. 1.
Figure 4:
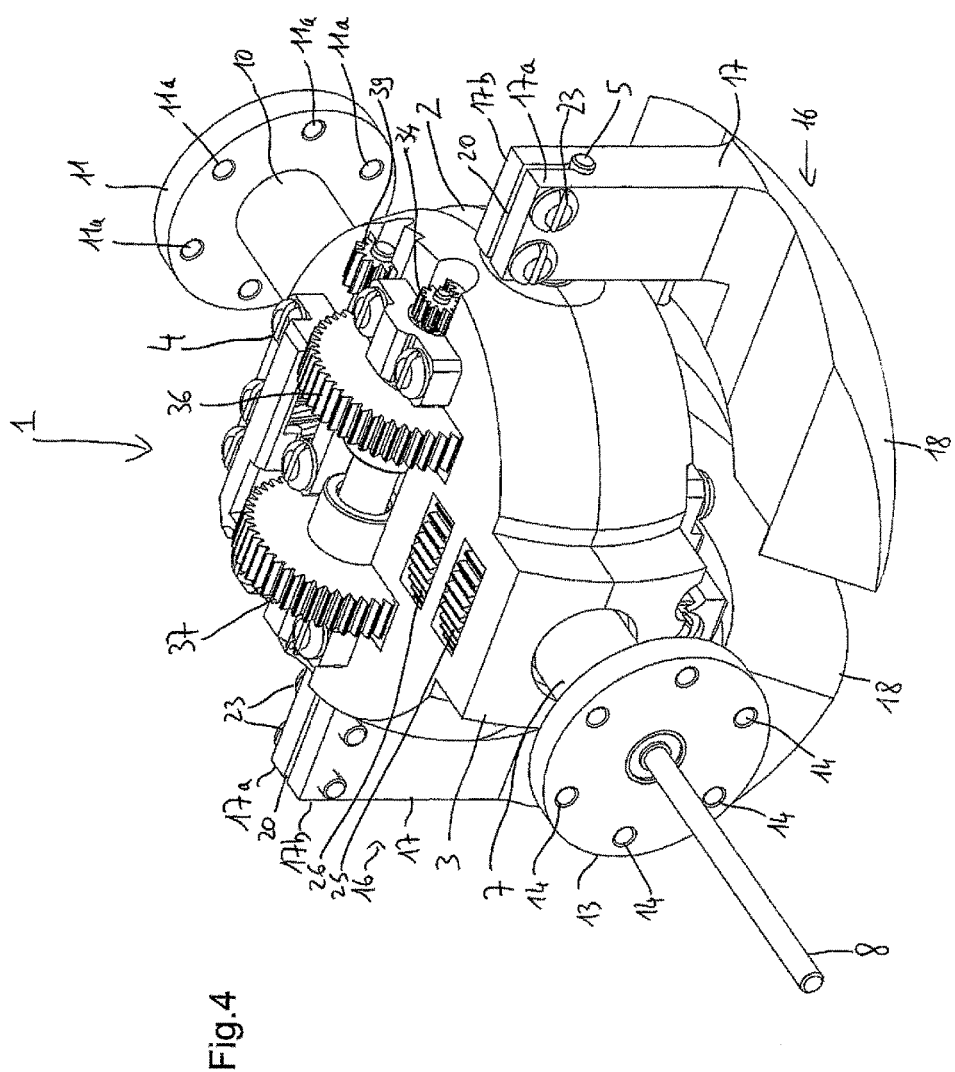
FIG. 4 is a perspective view similar to FIG. 3 of a body of an energy production device, with two pendulums.
Figure 5:
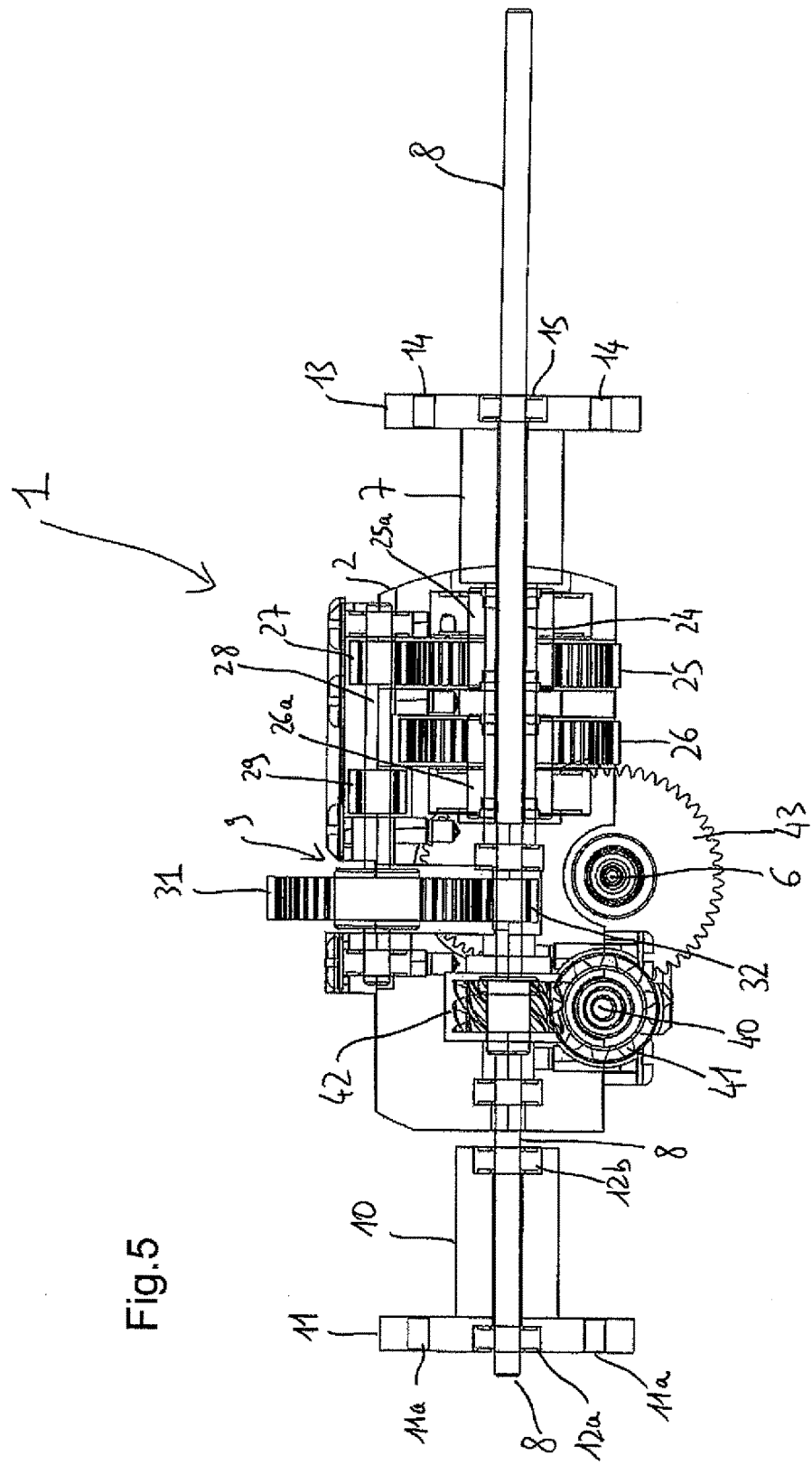
FIG. 5 is a cut-away view of the body of FIG. 1.

The energy production device 1 comprises a body 2 not shown in FIGS. 1-3 for an easier reading of the Figures, generally spherically-shaped, being shown on the FIGS. 4-5 in a partially cut-away top view and a partially cut-away side view for illustrating the arrangement of its inner mechanism.

The body 2 further comprises two protrusions 3, 4, on two opposite sides, at the front and at the rear of the body 2 as shown on FIG. 4, the function of these two protrusions 3, 4 being described hereinafter.

The device 1 comprises three input shafts 5, 6 and 7 and one output shaft 8 that protrude from the body 2. The shafts 7, 8 are aligned along on a first diameter of the sphere forming the body 2 which passes through protrusions 3, 4, the shafts 5, 6 being aligned along a second diameter of the sphere forming the body 2, the four shafts 5, 6, 7 and 8 being in the same plane and the axis of the shafts 5, 6 being perpendicular to the axis of the shafts 7, 8.

In the following description, the front of the body 2 will refer to the part of the body 2 from which the longest part of the output shaft 8 protrudes on the Figures, the back of the body 2 will refer to the part of the body 2 from which the shortest part of the output shaft 8 protrudes, the left part of the body 2 will refer to the part of the body 2 from which the input shaft 5 protrudes and the right part of the body 2 will refer to the part of the body 2 from which the input shaft 6 protrudes (see FIG. 3).

Each shaft 5, 6, 7 and 8 is connected by its proximal end inside the body 2 to a gearing mechanism, globally referenced under reference numeral 9, whose specific structure and connection with shafts 5, 6, 7 and 8 will be described hereinafter, so that any rotation movement on any input shaft 5, 6, 7 is converted through the gearing mechanism 9 to a unidirectional rotation movement on the output shaft 8.

Such a unidirectional rotation movement on the output shaft 8 is used, for example with an alternator (shown in the second embodiment), to produce electricity from any rotation movement on the input shafts 5, 6, 7.

In the embodiment shown on the FIGS. 1-5, a support 10 with a flange 11 at one end, has two bearings 12a, 12b which support the shortest end the output shaft 8, the support 10 being fixed to a frame (shown in the second embodiment) by screws introduced in through holes 11a formed in the flange 11.

Similarly, the input shaft 7 has a flange 13 integrally formed with the input shaft 7 at one end, with a bearing 15 which supports the longest part of the output shaft 8, the flange 13 also being fixed to the same frame (shown in the second embodiment) by screws introduced in through holes 14 formed in the flange 13.

On the distal part on each of the input shafts 5, 6 is fixed a pendulum 16 which drives into rotation the corresponding input shaft, respectively 5, 6. The pendulums 16 on each of the input shafts 5, 6 are identical.

Figure 6:
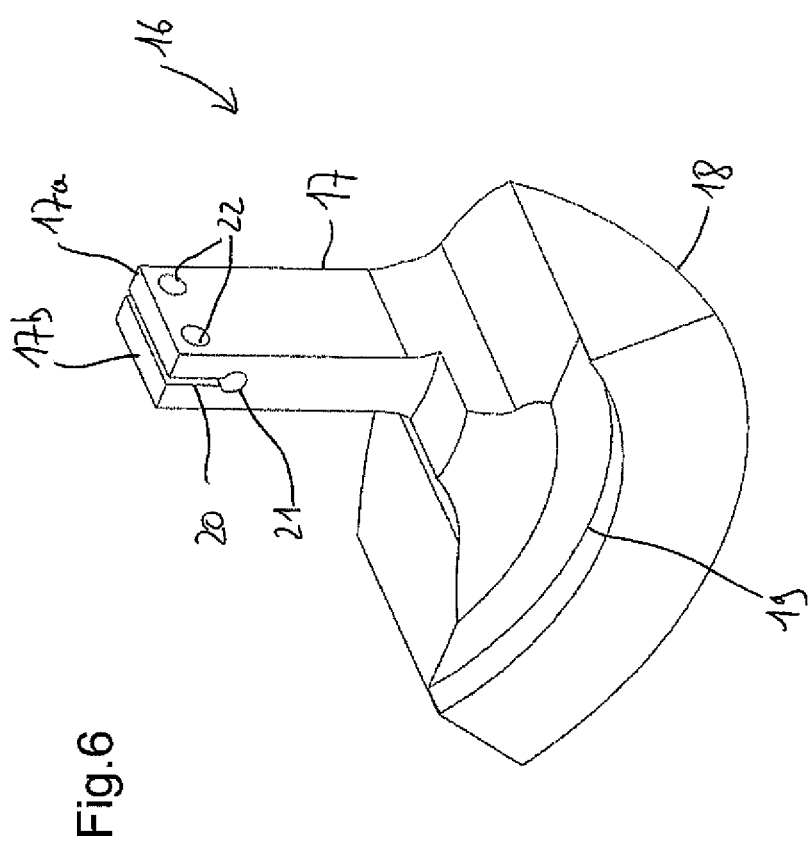
FIG. 6 is a perspective view of a pendulum according to the invention.
Figure 7:
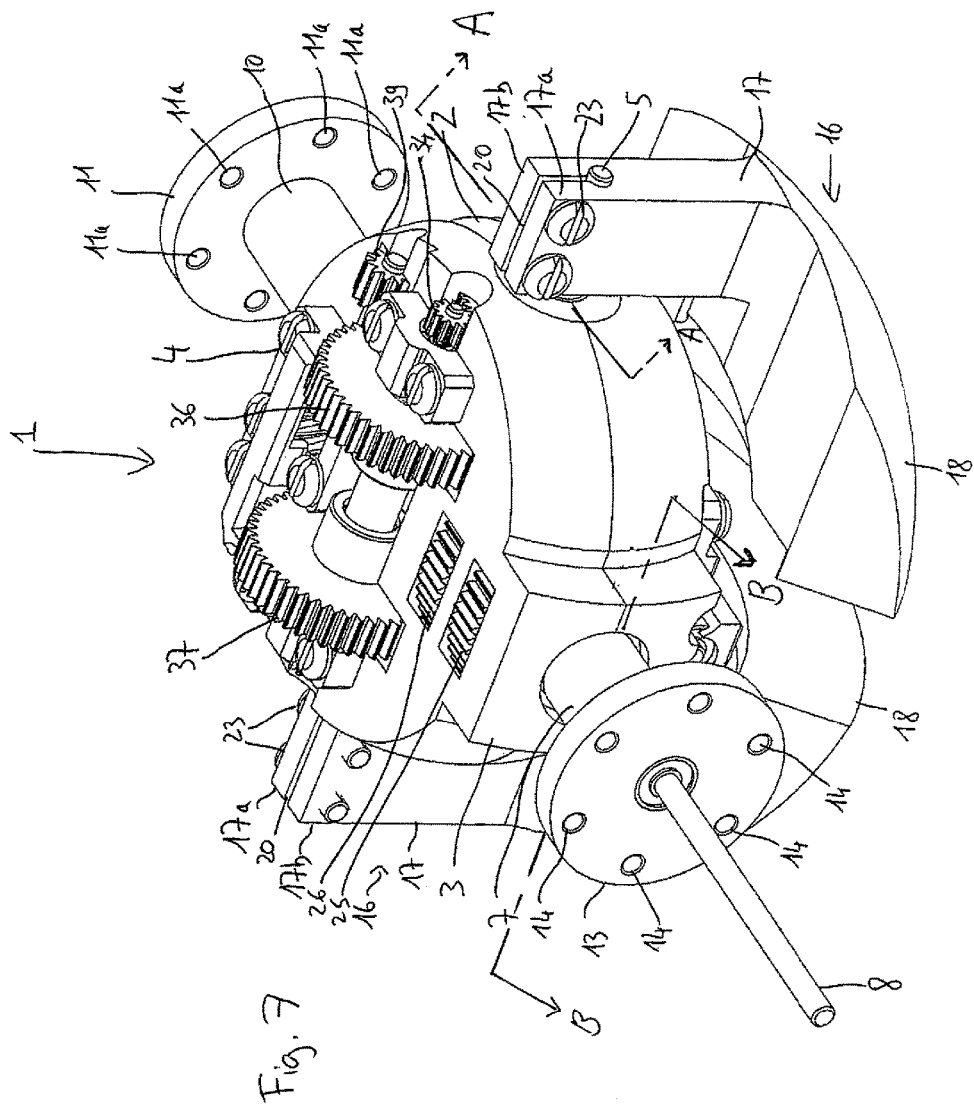
FIG. 7 is a perspective view of a further embodiment of the energy production device.

The form of the pendulum 16 is better illustrated in FIG. 6.

The pendulum 16 comprises an arm 17 and a weight 18.

The arm 17 is sufficiently long so that the weight 18 can move about the body 2. The form of the weight 18 is curved so that the weight 18 can move around the body 2, without contacting the shafts 7, 8 or the support 10.

The curved shape of the weight 18 allows to have the maximum weight and to move freely about the spherically shaped body 2.

A groove 19 is formed on the edge of the surface of the weight 18 facing the body 2 in use, the groove 19 being opposite to the arm 17 and engaging in use with the protrusions 3, 4 formed at the front and back of the body 2. The groove 19 is for clearance to make sure the pendulum 16 does not hit the body 2 of transmission.

The upper part of the arm 17 has two branches 17a, 17b separated by a slit 20 extending along the longitudinal direction of the arm 17, with a cylindrical through hole 21 at the basis of the branches 17a, 17b and in communication with the slit 20 to receive the free end of the corresponding input shaft 5, 6.

Through holes 22 are formed at the free end of the branches 17a, 17b, to receive screws and bolts 23 to clamp the free end of the corresponding input shafts 5, 6.

In use, the pendulums 16 are clamped to the free end of the corresponding input shaft 5, 6 and their movement drives said shafts into motion.

The shape of the pendulums 16 and the spherically shaped body 2 ensure maximum compactness of the device 1, without the pendulums 16 interfering with the shape of the body 2, which could both limit the movement of pendulums 16 and damage the body 2.

Although not shown on the Figures, the invention also contemplates a counterbalance weight on the pendulums 16, said counterbalance weight being at the end of the arm 17 opposite to the end supporting the weight 18.

When the body 2 is spherical as in the embodiment shown in the Figures, the counterbalance weight is preferably slightly smaller and lighter than the weight 18, and also has a curved shape to rotate around the body 2 without interfering with the shape of the body 2. The effect of the counterbalance weight is to slow the pivoting movement frequency of the pendulum 16 with respect to the pendulum 16 with only the weight 18, as shown on drawings.

Referring now to FIGS. 7 to 12, a further embodiment is shown with the same components being referred to with the same identifiers as with the embodiments in FIGS. 1 to 6. In this embodiment, the pendulum weight 18 consists of several electrical charge storage means, or battery cells 45 which fit within the pendulum weight 18 without distorting its shape or restricting its rotational motion. Furthermore, the weight of the battery cells 45 is specifically selected to ensure the functionality of the pendulum weight 18. In one embodiment the battery cells 45 are prefabricated and fit into specifically designed cavities in the pendulum weight 18. In another embodiment the battery cells 45 could be formed in the desired shape to comprise the entire pendulum 16 itself. Any suitable battery technology can be used depending on the desired weight density, power density and cost, which would depend upon the application the energy saving device was to be used for. A Nickel iron battery could be used for higher weight characteristic for example, or a lithium ion battery for lower weight but higher charge and power.

The battery cells 45 are electrically connected the alternator 46 via the output shaft 8 and the body 2 of the energy production device 1 by means of the dynamic electrical power transfer means or slips rings 50. The output shaft 8 and the left and right pendulum shafts 5 and 6 are electrically connected to the body 2 by a slip ring 50, shown in FIG. 12. This would allow smooth rotation of the shafts 6, 7 and 8 whilst providing electrical contact for current to flow to charge the battery cells when the device is producing net energy and also to discharge the battery cells when the device is producing negative net energy.

Figure 8:
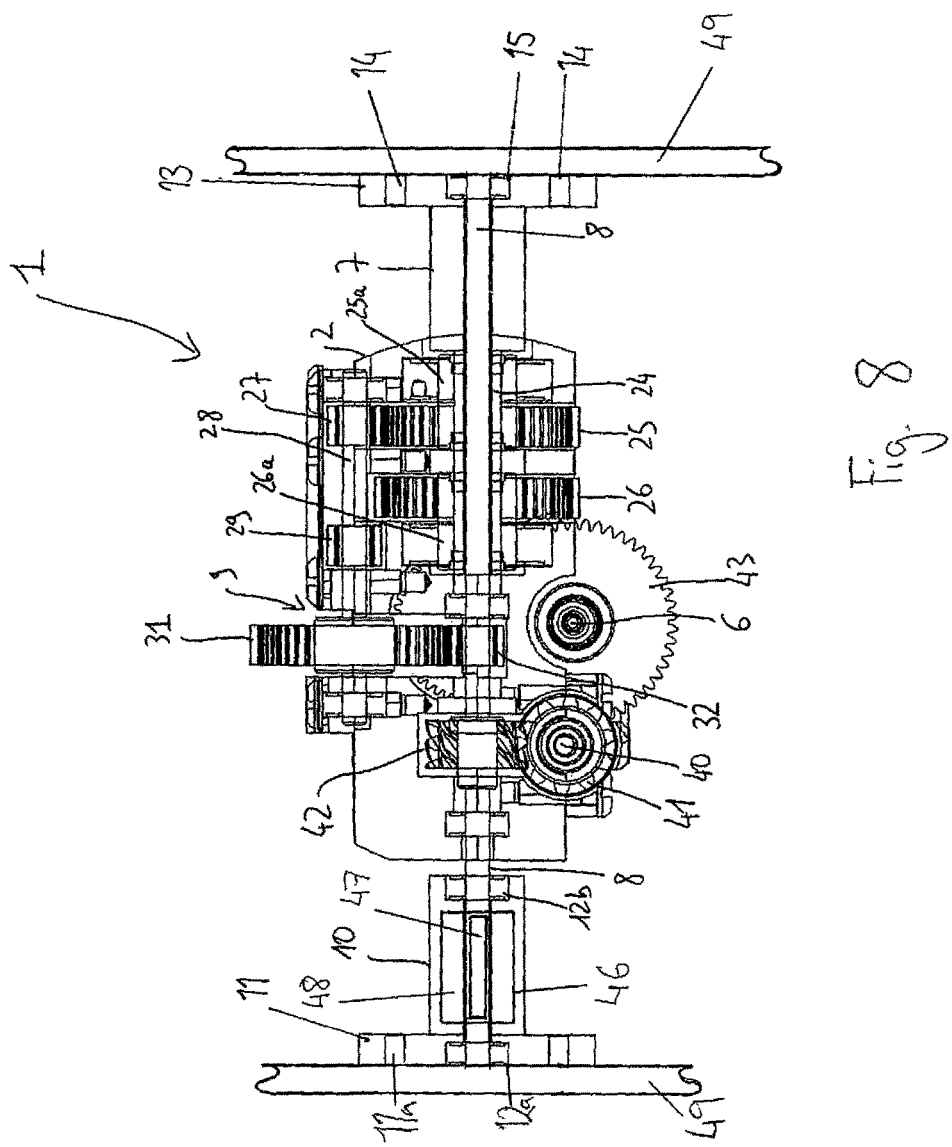
FIG. 8 is a partial cut-away top view of a body of an energy production device of FIG. 7.
Figure 9:
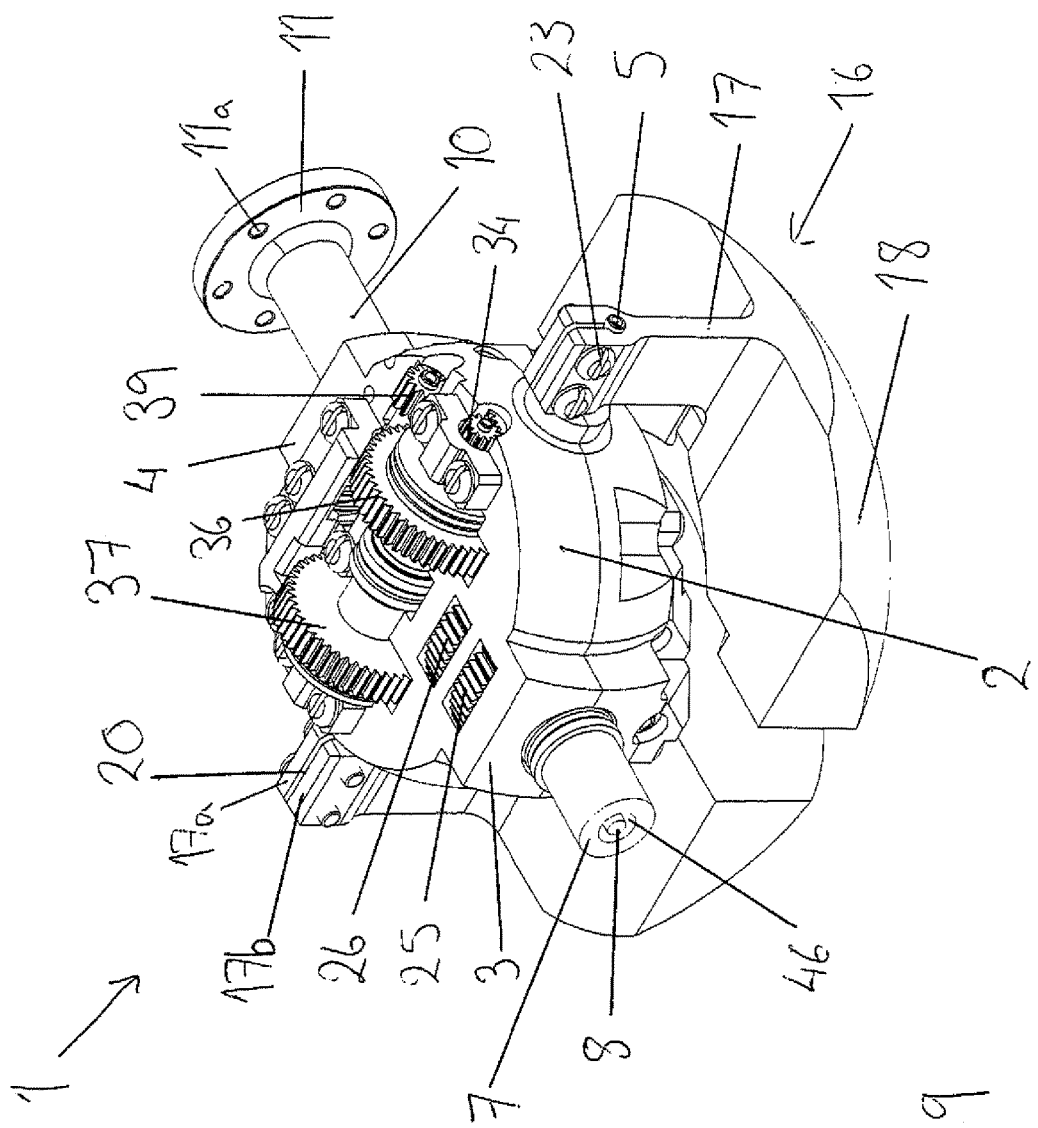
FIG. 9 is a partial cut-away perspective view of a body of an energy production device of FIG. 7, with two pendulums.
Figure 10:
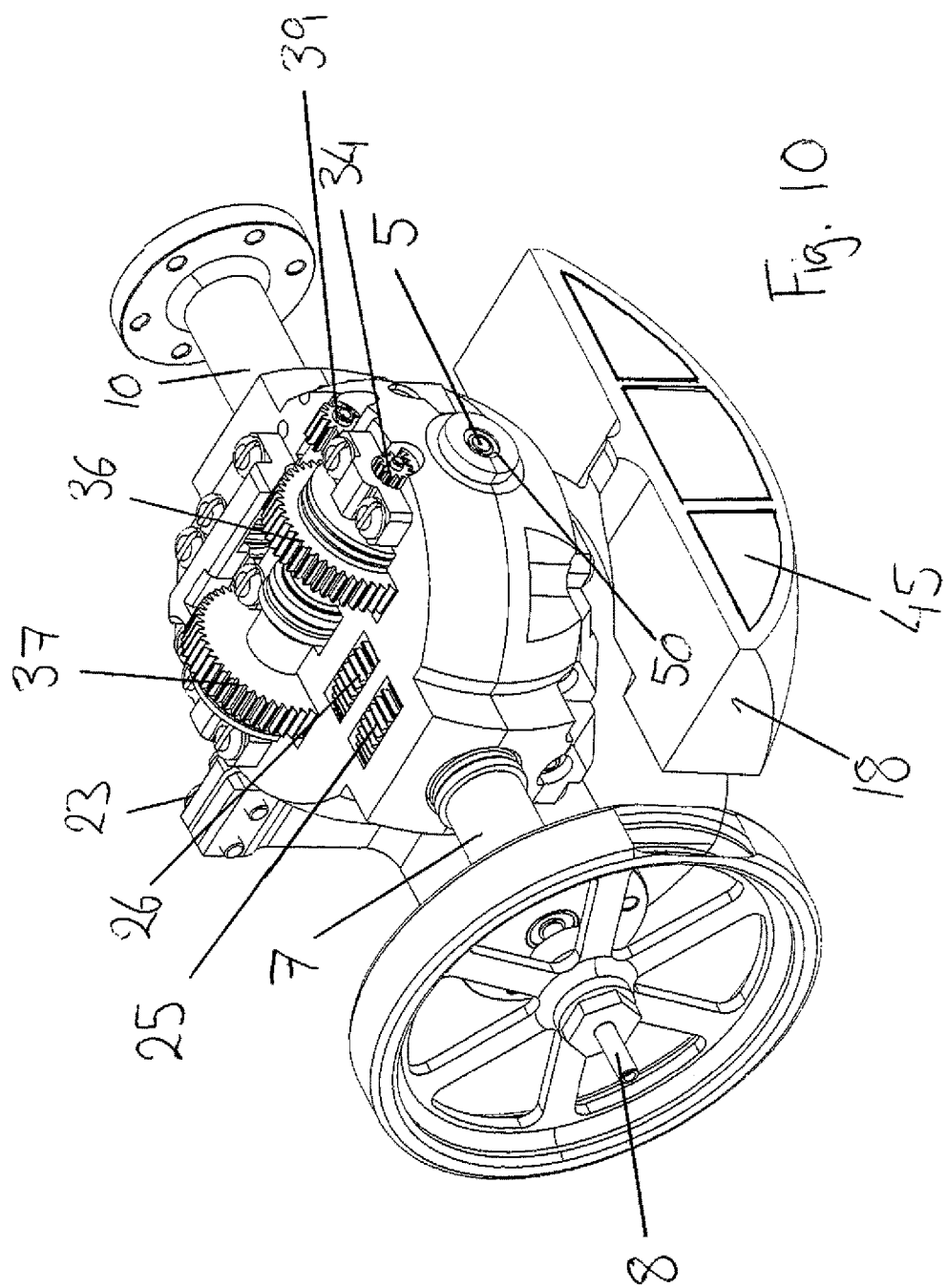
FIG. 10 is a partial cut-away perspective view of a body of the energy production device of FIG. 9.

Referring to FIGS. 8 and 9, the alternator 46 consists of a coil 47 and a permanent magnet 48. The alternator can be located in the input shaft 7, as shown in FIG. 8. In the embodiment shown in FIG. 8 to form the alternator a permanent magnet 48 is embedded in the support 10 and the coil 47 is located in the output shaft 8, such that the coil 47 rotates with the rotation of the output shaft 8 relative to the static permanent magnet 48. Rectifier means are also provided to convert the AC generated to DC for storage in the battery cells. Dynamic power transfer means are also provided (not shown) which transfer current from the output shaft to an external electrical connection means (not shown) on an external surface of the frame 49. The device can be configured to provide AC or DC power at the external connection means, or both. It will be appreciated that the alternator could be arranged in alternative ways including the coil being located at the fixed support and electrically connected to the external electrical connection means, and permanent magnets located in the output shaft 8 with rotating electrical connection transferring current from the coil to an electrical lead in the output shaft 8.

Figure 11:
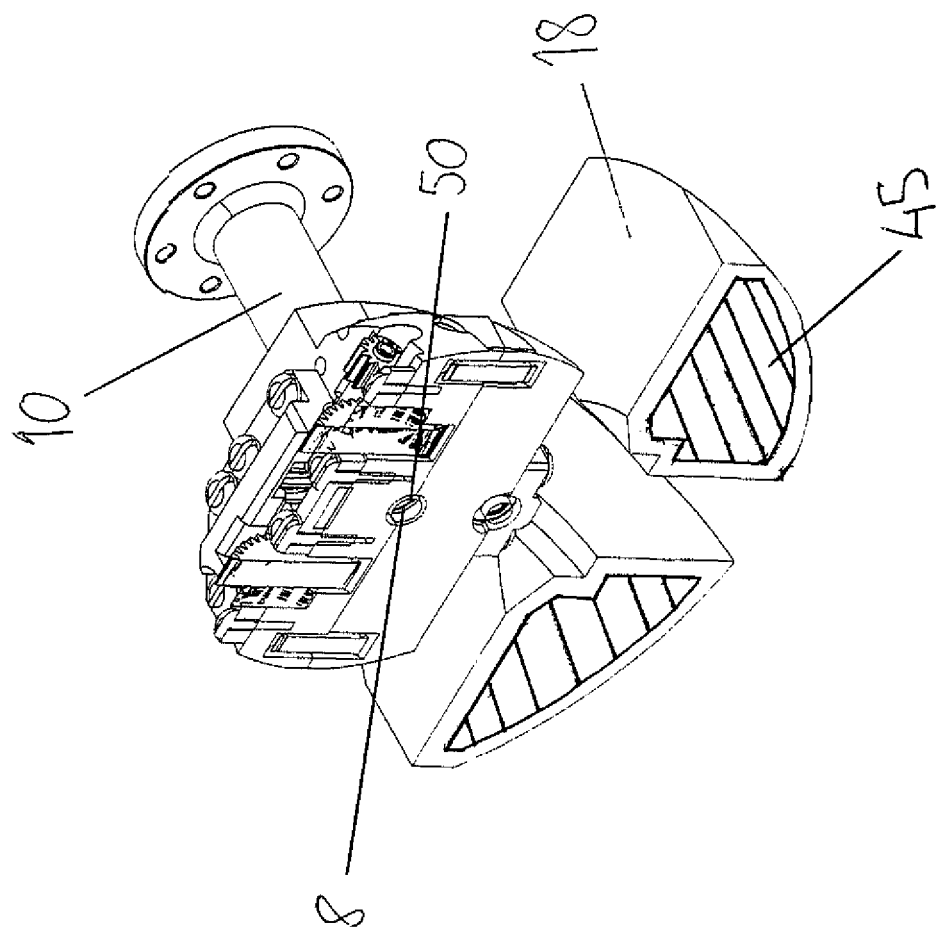
FIG. 11 is a sectional view in perspective through the centre of the body of the energy production device of FIG. 9.

The electrical current passing from the alternator 46 to the battery cells 45 passes through a slip ring 50 between the output shaft 8 and an electrical lead (not shown) in the body 2, as shown in FIG. 11. The electrical current then passes through a further slip ring 50 between the electrical lead (not shown) in the body 2 into the pendulum arms 5, 6, and thus to the battery cells. Similarly, when charge is drawn from the battery, the current flows in the opposite direction.

Referring to FIG. 12, and depending on whether the battery cells are being charged or discharged, the slip ring 50 allows the transfer of electrical current from the stator leads 51 of the body 2 to the rotator leads 52 of the shafts 5, 6 and 8 via the contact rings 53 and brush contact 55, whilst the shafts are rotating. This dynamic rotating contact allows the passage of charge during rotational movement of the shafts 5, 6 and 8, whilst keeping frictional resistance of the contact to a minimum. In this embodiment the brush contact is made of graphite a highly electrically conductive material with a low frictional coefficient.

Electronic control means (not shown) are also provided to control the flow of charge to or from the battery depending on the generation power from the energy saving device and on the power demand placed on the device through the external connection means (not shown) on the frame 49. Display means may also be provided on the external surface of the frame 49, in order to show the user the extent of charge remaining in the battery cells and also the current power being produced and/or consumed.

The gearing mechanism 9 will now be described in greater details.

The transmission between the input shaft 7 and the output shaft 8 will be described first, and then the transmission between the input shafts 5, 6 and the output shaft 8 will be described.

As indicated above, the output shaft 8 aligned with the input shaft 7 is supported at one end in the support 10 by bearings 12a and 12b.

The input shaft 7 extends into a tube 24 integrally formed with the input shaft 7 that passes through a first gear wheel 25 and a second gear wheel 26, each one of the first and second gear wheels 25, 26 being connected to a one-way clutch, respectively 25a, 26a. The input shaft 7, through the tube 24 engages with the clutch 25a in a first direction of rotation and with the clutch 26a in a direction of rotation opposite to the first direction.

In the first direction of rotation, where the input shaft 7 engages with the clutch 25a, which itself engages with the output shaft 8, thereby driving the output shaft in the same direction of rotation than the input shaft 7.

In the opposite direction of rotation of the input shaft 7 the input shaft 7 does not engage with the output shaft 8 as the one-way clutch 25a does not engage the output shaft 8.

However, the input shaft 7, through the tube 24, engages with the gear wheel 26 through the one-way clutch 26a and therefore drives the gear wheel 26 in the same direction of rotation.

Gear wheel 26 then meshes with gear wheel 30, which in turn meshes with gear wheel 29 on the axis 28 on which are arranged gear wheel 31 and gear wheel 27.

Gear wheel 31 and 27 are engaged on axis 28.

When driven through axis 28, the gear wheel 31 meshes with gear wheel 32, engaged with the output shaft 8 and driving the output shaft 8.

Thus, whatever the rotation direction of the input shaft 7, the direction of rotation on the output shaft 8 is the same, namely unidirectional. Rotational movement of the inputs shafts will be induced by movement of the frame which in turn will be caused by external movement from the waves, by a person walking or jogging, or other external environmental movement depending on the application.

The transmission from the input shafts 5, 6 to the output shaft 8 will now be described.

The input shaft 5 engages a gear wheel 33.

The gear wheel 33, when driven by the rotation of the input shaft 5 in the correct direction of rotation, meshes with a gear wheel 34.

Gear wheel 34 engages on an axis 35 which bears two gear wheels 36 and 37, each engaging with the axis 35 through a one-way clutch, respectively 36a and 37a, so that gear wheel 36 engages with axis 35 in one of its direction of rotation and gear wheel 37 engages with axis 35 in its other direction of rotation.

When engaged by axis 35, gear wheel 36 meshes with gear wheel 38 which in turn meshes with gear wheel 39. Gear wheel 39 engages with an axis 40 and drives into rotation axis 40 on which is fixed a helical gear 41 which meshes with a helical gear 42 on the output shaft 8 to drive it in one direction of rotation.

On input shaft 6, a gear wheel 43 is engaged on the input shaft 6. Similarly to the input shaft 5, when engaged with input shaft 6, gear wheel 43 engages with a gear wheel (not shown but similar to gear wheel 34) engaged with the axis 35 and drives into rotation gear wheel 37 which meshes with gear wheel 44, engaged with axis 40. The rotation of gear wheel 44 drives into rotation helical gear 41 to drive into rotation helical gear 42 and therefore the output shaft 8.

The one-way clutches are mounted so that, if the distal ends of input shafts 5, 6 were rigidly linked, one direction of rotation of shafts 5, 6 would engage the transmission relating to a first one of the shafts while not engaging the transmission relating to the second shaft, the opposite direction of rotation of shafts 5, 6 engaging the transmission of the second shaft while not engaging the transmission of the first shaft.

As such, for instance when the pendulums 16 are rigidly linked, whatever the movement, there is still one shaft that can transfer movement energy on the output shaft 8.

The one-way clutches ensure that only one of the input shafts transfers movement on the output shaft 8.

Moreover, the structure is such that, whatever the movement on the input shafts 5, 6, the helical gears 41, 42 always have the same direction of rotation.

Although the invention is disclosed with helical gears, the invention is not thereby limited, and bevel gears could be used to transfer the movement to the output shaft 8 instead of the helical gears, without departing from the scope of the invention.

This unidirectional direction of rotation of the output shaft 8 corresponds to the unidirectional rotation direction obtained through input shaft 7, so that whatever the rotation direction on any of the input shafts 5, 6 and 7, a unidirectional rotation movement is obtained on the output shaft 8.

As indicated above, the pendulums 16 can be rigidly linked, or can be independent. In any case, there will still be a unidirectional rotation movement on the output shaft 8.

An enhancement of the invention could be obtained by performing the same transmission as the input shaft 7 on the input shafts 5, 6, in the case where the pendulums 16 are independent. Indeed, when independent, it would allow to recover energy from any movement of the pendulum 16 on any of the input shafts 5, 6.

In the embodiment disclosed above, should the pendulums 16 be independent from each other, only one direction of rotation of a pendulum 16 on any rotation axis would transfer energy on the output shaft 8.

In use, the body 2 is fixed to a frame through flanges 11 and 13.

The body 2 is then free to rotate. The frame can then be put in an enclosure, for example a sphere, in which the frame is rigidly fixed.

The supports and corresponding bolts and screws within the body 2 that allow the gear wheels and shafts to be fixed are not referenced in order not to overload the Figures with reference numerals.

The sphere can then put on an unstable environment. For example, the sphere could be put in sea, the tidal movement creating a movement of the pendulums generating a rotation of the output shaft 8 and the rotation of the body 2 around its input shaft 7 also creating a rotation on the output shaft 8 and therefore power through an alternator. Said power could then be stored in a battery or sent in a utility grid.

The device of the invention could however collect energy from all forms of Natural Occurring Motional Energy (NOME) namely water, wind, human animal or rough vehicle motion.

It is important to note that the device of the invention can be of any size.

Although a specific embodiment for converting movement from input shafts to output shaft has been described, the invention is not limited to such an embodiment, and any transmission that allows to convert a unidirectional rotation movement on any of three shafts to a unidirectional rotation movement on an output shaft is contemplated in the invention. For instance, the transmission disclosed in the UK patent application GB244465 could also be contemplated within the scope of the invention.

The alternator and/or battery can be within the frame or outside the frame, without departing from the scope of the invention.

Also, although the output shaft has been shown to protrude on each side of the body, this is not necessary as long as the rotation on any of the input shafts can be transferred unidirectionally on the output shaft.

It can be contemplated also to have several devices in series, without departing from the scope of the invention.

COMPONENT LIST

1. Energy Production Device
2. Body
3. Front Protrusion
4. Rear Protrusion
5. Left Input Shaft
6. Right Input Shaft
7. Front Input Shaft
8. Output Shaft
9. Gearing Mechanism
10. Support
11. Flange (11a—Holes in Flange)
12. Two Bearings
13. Front Input Shaft Flange
14. Holes in Front Input Shaft Flange
15. Bearing
16. Pendulum
17. Pendulum Arm (17a/17b—Arm Branches)
18. Pendulum Weight
19. Groove
20. Slit
21. Hole in Pendulum Arm
22. Hole in Pendulum Arm Branches
23. Screws/Bolts
24. Tube
25. First Gear Wheel (25a—First Clutch)
26. Second Gear Wheel (26a—Second Clutch)
27. Third Gear Wheel
28. First Axis
29. Fourth Gear Wheel
30. Fifth Gear Wheel
31. Sixth Gear Wheel
32. Seventh Gear Wheel
33. Eighth Gear Wheel
34. Ninth Gear Wheel
35. Second Axis
36. Tenth Gear Wheel
37. Eleventh Gear Wheel
38. Twelfth Gear Wheel
39. Thirteenth Gear Wheel
40. Third Axis
41. First Helical Gear
42. Second Helical Gear
43. Fourteenth Gear Wheel
44. Fifteenth Gear Wheel
45. Battery Cells
46. Alternator
47. Coil
48. Permanent Magnets
49. Frame
50. Slip Ring
51. Stator Leads
52. Rotator Leads
53. Contact Rings
54. (Not Used)
55. Brush Contact

The invention claimed is:

1. An energy production device comprising:
a frame;
a body;
first and second aligned input shafts projecting from two opposite faces of the body;
a third input shaft aligned with an output shaft, the direction of the third input shaft and of the output shaft being perpendicular to the direction of the first and second input shafts;
mechanical connection means at the proximal end of each of the shafts which is within the body, said mechanical connection means operating with a transmission system within the body so that any rotation movement on any of the input shafts is converted into a unidirectional rotation movement on the output shaft;
a distal end of the third input shaft being fixed to the frame;
a bearing fixed on said frame, into which the distal end of the output shaft is freewheeling;
a first pendulum mounted on a bearing at the distal end of the first input shaft to pivot around the first input shaft;
a second pendulum mounted on a bearing at the distal end of the second input shaft to pivot around the second input shaft;
an alternator connected to the output shaft to convert the unidirectional movement of the output shaft into electricity,
an electrical energy storage means for storing electrical charge; and
external electrical connection means on the outside surface of the frame electrically connected to the alternator to permit electricity generated by the energy production device to be used;
wherein the electrical energy storage means, or part thereof, is located in the pendulum and dynamic power transfer means are provided between the alternator and the pendulum in order to transfer the power between the alternator and the pendulum to store generated power in the electrical energy storage means and to draw stored charge from the electrical energy storage means.

2. The energy production device according to claim 1, wherein the electrical energy storage means for storing electrical charge comprises a battery connected to the alternator.

3. The energy production device according to claim 1, wherein the body is spherically-shaped, the first and second input shafts being substantially on one of the diameters of the sphere, and wherein each pendulum comprises a weight including an end facing said body, said end of each pendulum facing said body being curved complimentary to the shape of the body so that each pendulum is able to pivot around the body.

4. The energy production device according to claim 1, wherein each pendulum comprises a weight connected to an arm, and wherein each pendulum further comprises a counterbalance weight, said counterbalance weight located on an end of the arm opposite to the end connected to the pendulum weight.

5. The energy production device according to claim 1, wherein the first and second pendulums pivot independently from each other.

6. The energy production device according to claim 1, wherein each pendulum comprises a respective weight, the weights of the pendulums being rigidly linked to each other so that the weights pivot synchronously around their respective shafts.

7. The energy production device according to claim 1, wherein the mechanical connection means of the shafts to the transmission system comprise any of toothed gears, chains and cogs, belts and pulley wheels and any combination thereof.

8. The energy production device according to claim 1, wherein the transmission system between the mechanical connection means of the input shafts and the mechanical connection means of the output shaft comprises any of toothed gears, chains and cogs, belts and pulley wheels and any combination thereof.

9. An energy production device comprising:
a frame;
a body;
at least one first input shaft;
a further input shaft aligned with an output shaft;
mechanical connection means at the proximal end of each of the shafts which is within the body, said mechanical connection means operating with a transmission system within the body so that any rotation movement of any of the input shafts is converted into a unidirectional rotation movement of the output shaft;
the further input shaft being fixed to the frame;
a bearing fixed on said frame, into which the distal end of the output shaft is mounted and freewheeling;
at least a first pendulum mounted on the first input shafts to pivot with the first input shaft;
an alternator connected to the output shaft to convert the unidirectional movement of the output shaft into electricity;
an electrical energy storage means for storing electrical charge;
external electrical connection means on the outside surface of the frame electrically connected to the alternator to permit electricity generated by the energy production device to be used;
wherein the electrical energy storage means, or part thereof, is located in the pendulum and dynamic power transfer means are provided between the alternator and the pendulum in order to transfer the power between the alternator and the pendulum to store generated power in the electrical energy storage means and to draw stored charge from the electrical energy storage means.

10. The energy production device according to claim 9, further comprising power conversion means for converting the generated AC power into DC which can be stored in the electrical energy storage means.

11. The energy production device according to claim 9, wherein the external electrical connection means is DC.

12. The energy production device of claim 9, further comprising:
an enclosure into which is fixed the frame or constituting the frame; and,
an electrical energy storage device electrically connected to the alternator.

* * * * *